United States Patent
Slager et al.

(10) Patent No.: US 11,442,694 B1
(45) Date of Patent: *Sep. 13, 2022

(54) MERGING DATABASE TABLES BY CLASSIFYING COMPARISON SIGNATURES

(71) Applicant: Amperity, Inc., Seattle, WA (US)

(72) Inventors: Derek Slager, Seattle, WA (US); Stephen Meyles, Seattle, WA (US); Yan Yan, Seattle, WA (US); Carlos Sakoda, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/787,576

(22) Filed: Feb. 11, 2020

Related U.S. Application Data (63) Continuation of application No. 15/729,990, filed on Oct. 11, 2017, now Pat. No. 10,599,395.

(51) Int. Cl.

| | |
|---|---|
| *G06F 7/02* | (2006.01) |
| *G06F 16/00* | (2019.01) |
| *G06F 7/32* | (2006.01) |
| *G06F 16/2455* | (2019.01) |
| *G06F 16/23* | (2019.01) |
| *G06F 16/24* | (2019.01) |
| *G06F 16/215* | (2019.01) |
| *G06F 7/14* | (2006.01) |

(52) U.S. Cl.
CPC .......... *G06F 7/32* (2013.01); *G06F 16/24556* (2019.01); *G06F 7/14* (2013.01); *G06F 16/215* (2019.01); *G06F 16/2365* (2019.01); *G06F 16/24* (2019.01)

(58) Field of Classification Search
CPC ...... G06F 16/215; G06F 16/24; G06F 16/244; G06F 16/2365; G06F 16/2393; G06F 16/00; G06F 7/14; G06F 7/32; G06F 16/24556

See application file for complete search history.

(56) References Cited

U.S. PATENT DOCUMENTS

| | | |
|---|---|---|
| 5,819,268 A | 10/1998 | Hackett |
| 9,600,462 B2 | 3/2017 | Bastide et al. |
| 9,875,277 B1 | 1/2018 | Kiryakov et al. |
| 10,372,690 B2 * | 8/2019 | Mishra ............... G06F 16/2456 |
| 2006/0080312 A1 | 4/2006 | Friedlander et al. |
| 2009/0106299 A1 * | 4/2009 | Furusho .................... G06F 7/32 |
| 2012/0023107 A1 | 1/2012 | Nachnani et al. |
| 2015/0178346 A1 | 6/2015 | Bailey et al. |

* cited by examiner

*Primary Examiner* — Bruce M Moser
(74) *Attorney, Agent, or Firm* — George David Zalepa; Greenberg Traurig, LLP (57) ABSTRACT

The present disclosure relates to merging database tables. Systems and methods may involve performing a comparison between the first set of records and the second set of records and identifying a plurality of record pairs based on the comparison. Each record pair may comprise a record in the first set of records and a record in the second set of records. In addition, A feature signature may be generated for each record pair by comparing field values in each record pair. The feature signature may be classified to identify at least one related record pair. A merged database table may be generated such that it comprises the at least one related record pair and comprises a set of unique records among selected from the first set of records and the second set of records.

20 Claims, 8 Drawing Sheets

MERGING DATABASE TABLES BY CLASSIFYING COMPARISON SIGNATURES

CROSS REFERENCE TO RELATED MATTERS

This application is a continuation of U.S. patent application Ser. No. 15/729,990 filed Oct. 11, 2017, which is hereby incorporated by reference in its entirety.

BACKGROUND

In the course of business, large amounts of data records are collected and stored in one or more databases. These data records may reflect customer information, business records, events, products, or other records pertinent to a relevant business. These records can accumulate from a number of data sources. For example, a retail company may sell products over different channels such as online e-commerce platforms as well as physical store locations. The retail company may maintain separate customer records for each of its different retail channels.

Records may be maintained in separate database tables. Merging two database tables may be time consuming and costly. The present disclosure describes systems and methods of managing a database that overcomes a number of the drawbacks of prior art solutions. The advantages and benefits of the present disclosure will be discussed in further detail.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Various embodiments of the present disclosure relate to dynamically merging two or more database tables based on one or more user parameters. Merging database tables can be a time consuming and burdensome process. Techniques such as extract transform load (ETL) are time intensive processes that may require significant user input and human intervention to create a merged database table. This may be the case where there is a likelihood that redundant records exist within the two or more database tables that are being merged.

The present disclosure provides an effective way of dynamically merging two or more database tables. A user may specify parameters such as the desired database fields and/or a confidence level relating to the likelihood that two records represent the same real-world entity. In response to these parameters, a merged database table is dynamically generated. The original database tables are persistently stored so that they can be used to generate a variety of dynamically merged database tables as a user varies between different database parameters. Moreover, any links to relational tables continue to exist. This way, the dynamically created database table uses the preexisting links to any relational tables.

Figure 1:
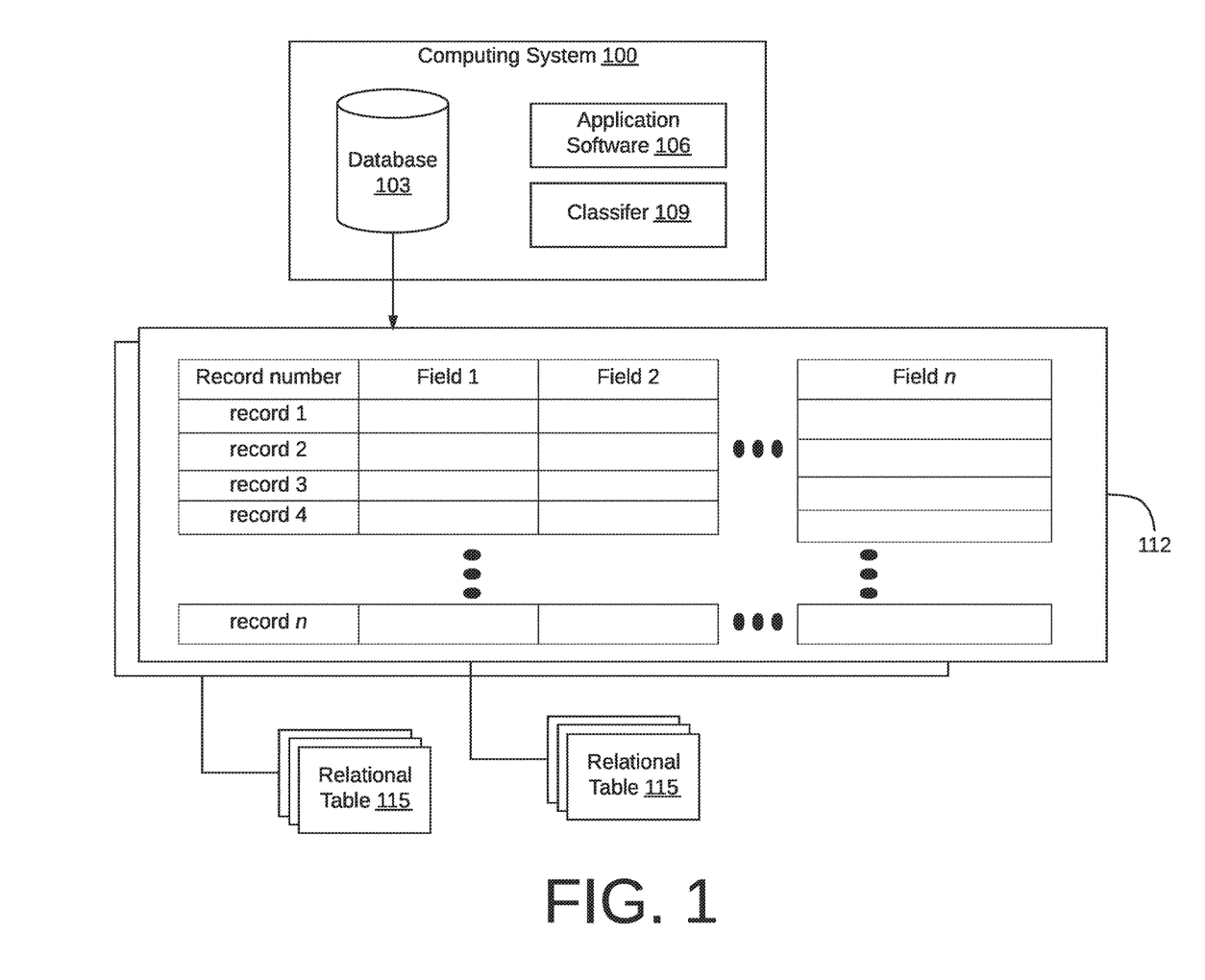
FIG. 1 is a drawing of a computing system 100 according to various embodiments of the present disclosure.

FIG. 1 shows a computing system 100 according to various embodiments. The computing system 100 is made up of a combination of hardware and software. The computing system 100 includes a database 103, software application 106, and a classifier 109. The computing system 100 may be connected to networks such as the Internet, intranets, extranets, wide area networks (WANs), local area networks (LANs), wired networks, wireless networks, or other suitable networks, etc., or any combination of two or more such networks.

The computing system 100 may comprise, for example, a server computer or any other system providing computing capability. Alternatively, the computing system 100 may employ a plurality of computing devices that may be arranged, for example, in one or more server banks or computer banks or other arrangements. Such computing devices may be located in a single installation or may be distributed among many different geographical locations. For example, the computing system 100 may include a plurality of computing devices that together may comprise a hosted computing resource, a grid computing resource and/ or any other distributed computing arrangement. In some cases, the computing system 100 may correspond to an elastic computing resource where the allotted capacity of processing, network, storage, or other computing-related resources may vary over time. The computing system 100 may implement one or more virtual machines that use the resources of the computing system 100.

Various applications and/or other functionality may be executed in the computing system 100 according to various embodiments. Also, various data is stored in the database 103 or other memory that is accessible to the computing system 100. The database 103 may represent one or more databases 103.

The data stored in the database 103 includes one or more database tables 112. A database table 112 includes several records, where each record has one or more corresponding fields. A database table 112 may be linked or otherwise associated with one or more relational tables 115. The components executed on the computing system 100 include a software application 106 and a classifier 109, which may access the contents of the database 103. When stored in a relational database 103, a database table 112 may be linked to one or more relational tables 115. For example, if an airline company maintained a database table 112 that stored customer records, there may be a relational table 115 storing the flight history for each customer. The contents of the relational table 115 links to a corresponding record.

Next, a general description of the operation of the various components of the computing system 100 is provided. Various businesses or other entities utilize the computing system to store information in a database 103. For example, businesses may want to store records reflecting customers, products, transactions, events, items, or any other piece of information relevant to the business. Records are collected over time and stored in one or more database tables 112. For example, when a business gets a new customer, a software program may create a record reflecting the new customer. This record may include the customer's name, address, contact information, or any other information that identifies the customer. Such information is stored as fields within a database table. The values in a field may be used to calculate one or more features between records.

In practice, a single record is sufficient to represent a customer. However, it is possible that duplicate or redundant records are inadvertently or unintentionally created and/or exist within one or more databases 103. For example, a customer may register with a business via an online portal which creates a customer record for that customer. Later, the same customer may inadvertently register again with the online portal, thereby creating a redundant customer record in the database table. Also, a company may have a first database table for its brick and mortar customers and a second database table for its e-commerce customers. It is possible that the same customer has a corresponding record in these two different database tables. As another example, two businesses maintaining their own customer records may merge such that the same customer may exist in two different database tables 112. The resulting merged database table could have redundant records reflecting the same customer.

Because multiple records may represent the same real-world entity, it is desirable to group related records together. A classifier 109 may be used to determine whether two records should be classified as a match based on the degree of related or common values between the two records. The classifier 109 may be a binary classifier that determines whether a pair of records represent the same real-world entity or whether they do not represent the same real-world entity. A record pair (i.e., two records being compared) is considered to be a related record pair if it represents the same real-world entity or an unrelated pair if it does not. A classifier 109 may make decisions based on a threshold level of similarity. The classifier 109 may calculate a confidence level (e.g., a score) that quantifies the degree of similarity between two records. Then, the classifier 109 may output a binary result (e.g., yes or no) that the two records are similar enough to be deemed a related record pair if the confidence level exceeds a threshold confidence level. The classifier 109 may make its determination based on the extent that two records contain similar information.

When comparing records, different combinations of field values among the two records are compared. For example, in one embodiment, the value of F1 of the first record is compared to the value of F1 of a second record, then the value of F2 of the first record is compared to the value of F2 of the second record, and so on. The comparison of two values yields a feature with respect to the record pair. A feature is a programmed calculation taking as inputs M records and/or other data, such as external metadata, and returning a numeric value as output. The variable M=2 in the case of handling a record pair. That numeric output may be, for example, a real value bounded between 0 and 1, or a binary value with two distinct outputs, 0 being considered "false" and 1 being considered "true." A feature score is the specific output value generated by a feature for a given set of records or record pair. A feature score refers to the degree that two field values are the same.

For example, comparing the first name field value of "Joseph" to the first name field value of "Joe" may yield a "first name feature" having a feature score of 0.88 on a scale of 0 to 1, where 0 means no-match and 1 means a perfect match. In other embodiments, the first name feature may be a binary value of "true/T," meaning match, or "false/F", meaning no-match. In addition, features may be determined based on a combination of field values. Here, a feature may be "full_name_match," which is a feature based on concatenating a first name field value with a last name field value.

The software application 106 dynamically merges two or more database tables 112 based on specified user parameters. The software application 106 uses the classifier 109 to determine whether two records appearing in two different database tables 112 should be represented as a single record in the dynamically merged database table. The software application 106 also creates the dynamically merged database table based on a user's specification of desired fields. The software application 106 may generate numerous dynamically merged database tables based on different parameters because the underlying database tables 112 are preserved along with any links to relational tables 115.

Figure 2:
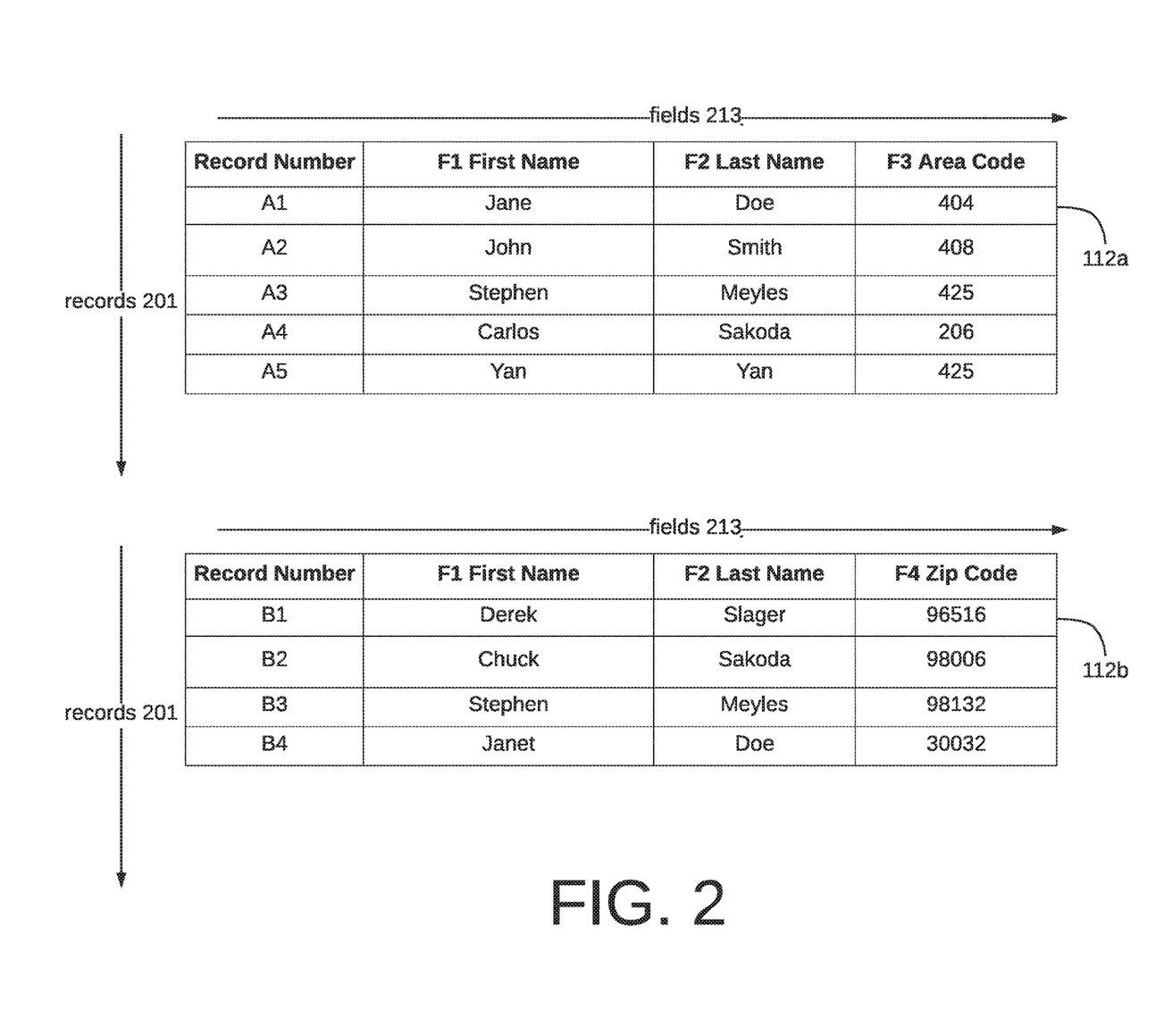
FIG. 2 is an example of database tables of FIG. 1 according to various embodiments of the present disclosure.

FIG. 2 shows an example of a first database table 112a and a second database table 112b that represent examples of database tables 112 stored in the database 103 of FIG. 1 according to various embodiments of the present disclosure. A database table 112 includes a set of records 201 and one or more fields 213. A record 201 may or may not have all its fields 213 populated with values. Each record is intended to represent an entity such as, for example, a person, thing, event, or place. Such entities reflect something that is part of the real-world. Moreover, records may contain different or possibly conflicting information even though they intend to represent the same real-world entity.

For example, in the first database table 112a, a first record "A1" is intended to be the record representing an individual named "Jane Doe." Record "A2" is intended to be the record representing "John Smith" and so on. A second database table 112b has different records 201, but some of those records may represent the same entity that is reflected by a record 201 in the first database table 112a. For example, both records "A3" and "B3" may represent the same individual named "Stephen Meyles," even though they are separate records 201.

FIG. 2 also shows how each database table 112 has its own set of fields 213. A field 213 provides a specification of a particular attribute of a record 201. If a record is a customer record, then a field 213 may be "first name" or "last name." The first database table 112a has three fields being F1, F2, and F3 which refer to "first name," "last name," and "area code," respectively. The second database table 112b has three fields being F1, F2, and F4 which refer to "first name," "last name," and "zip code," respectively. Fields F1 and F2 are common to both the first database table 112a and the second database table 112b. Fields F3 and F4 are not.

In various embodiments, the fields 213 are semantic fields such that they are normalized across several database tables 112. For example, a first database table 112a may have its F2 field originally called "last_name" while a second database table 112b may have its F2 field originally called "surname." By using semantic fields, the first and second database tables 112a and 112b conform to a universal format of identifying its fields. This way, the software application 106 (FIG. 1) understands that the "last_name" field of the first database table 112a maps to the "surname" field of second database table 112b. The database 103 may store a lookup table that maps original fields to semantic fields in order to normalize the fields across multiple database tables 112.

Figure 3:
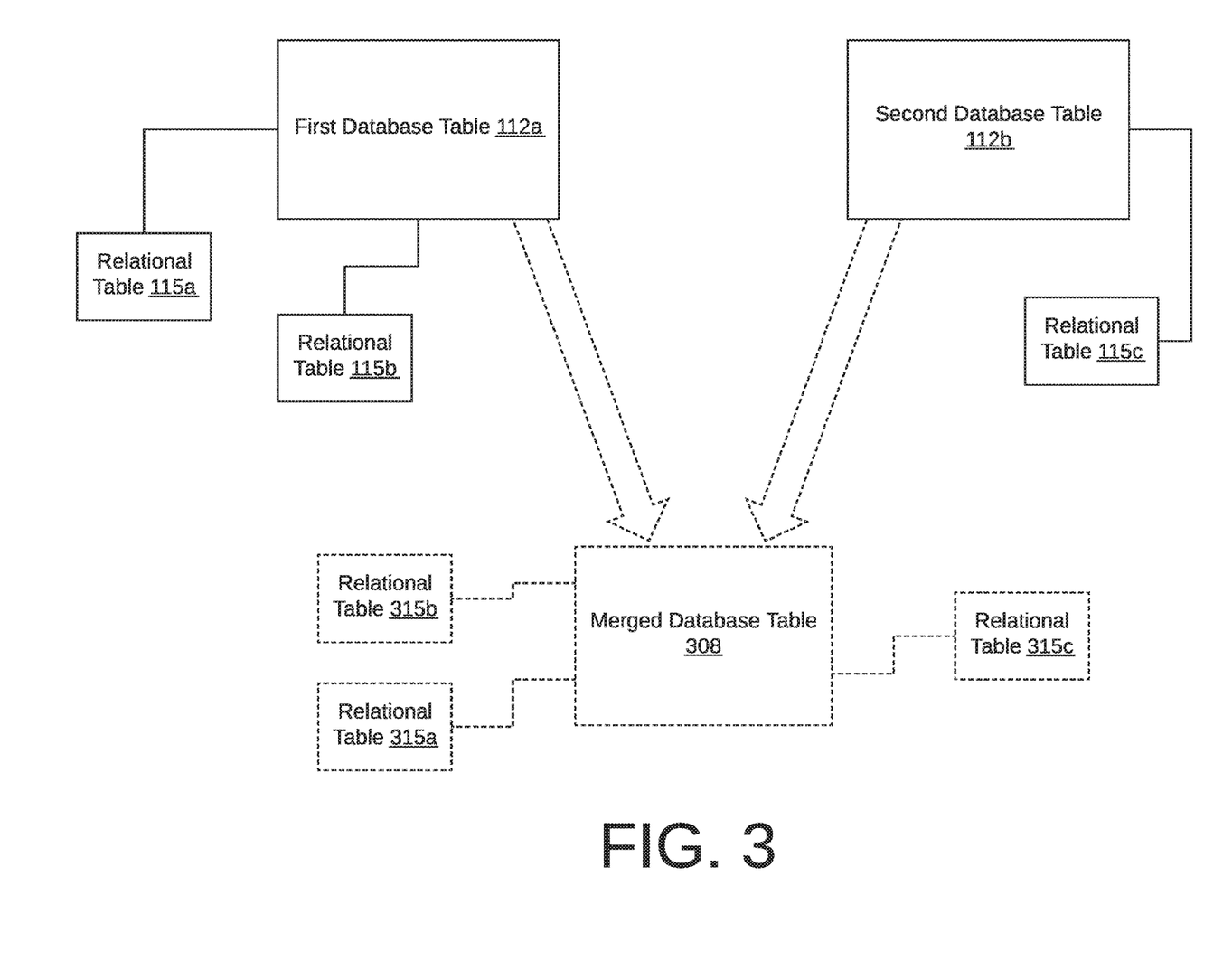
FIG. 3 is an is an example of merging two database tables in manner that is not dynamic.

FIG. 3 is an example of merging two database tables in manner that is not dynamic. Without employing the software application 106 of the present disclosure, a first and a second database table 112a and 112b are joined together to create a merged database table 308. This process requires significant manual input. The merged database may be scrubbed to identify duplicate records.

The first database table 112a is linked to a first relational table 115a and a second relational table 115b while the second database table 112b is linked to a third relational table 115c. When a merged database table 308 is created, new links are created in order to associate the merged database table 308 with the new relational tables 315a-c that are derived from the original relational tables 115a-c. Once the merged database table 308 is created along with replicating the links to relational tables 115, the first database table 112a and second database table 112b (along with any corresponding relational tables 115a-c) are no longer needed. The merged database table 308 is intended to be a comprehensive representation of all information contained within the first and second database tables 112a and 112b.

Figure 4:
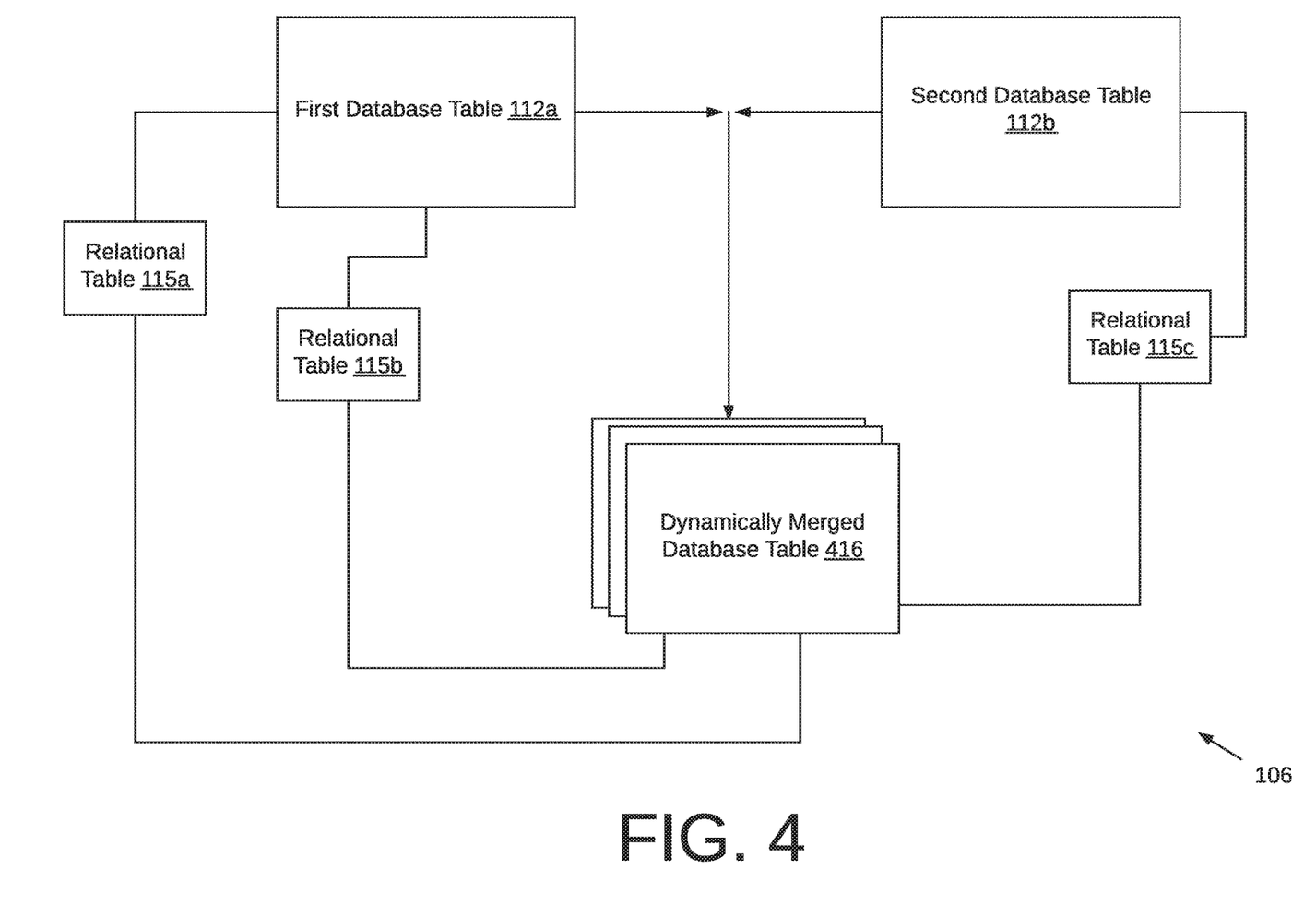
FIG. 4 is an example of dynamically merging database tables within the computing system 100 of FIG. 1 according to various embodiments of the present disclosure.

FIG. 4 is an example of dynamically merging database tables within the computing system 100 of FIG. 1 according to various embodiments of the present disclosure. FIG. 4 depicts the software application 106 that operates by dynamically merging a first database table 112a with a second database table 112b to create a dynamically merged database table 416. The software application 106 receives an input from a user that specifies certain parameters, which is discussed in more detail with respect to FIG. 6. The parameters specify how to construct a dynamically merged database table 416. For example, the parameters may include a threshold confidence level relating to the probability that two records represent to the same entity. As discussed in further detail below, the software application 106 may generate various dynamically merged database tables 416, each of which are customized based on user-specified parameters.

In response to receiving parameters, the software application 106 generates a dynamically merged database table 416 on the fly. In addition, the first and second database tables 112a and 112b are preserved so that more dynamically merged database tables 416 may be created by varying the parameters.

In addition, the dynamically merged database table 416 is linked to preexisting relational tables 115. In other words, the software application 106 does not need to create new relational tables 115 that are linked to the dynamically merged database table 416. This is demonstrated in further detail with respect to FIGS. 6A and 6B.

Figure 5:
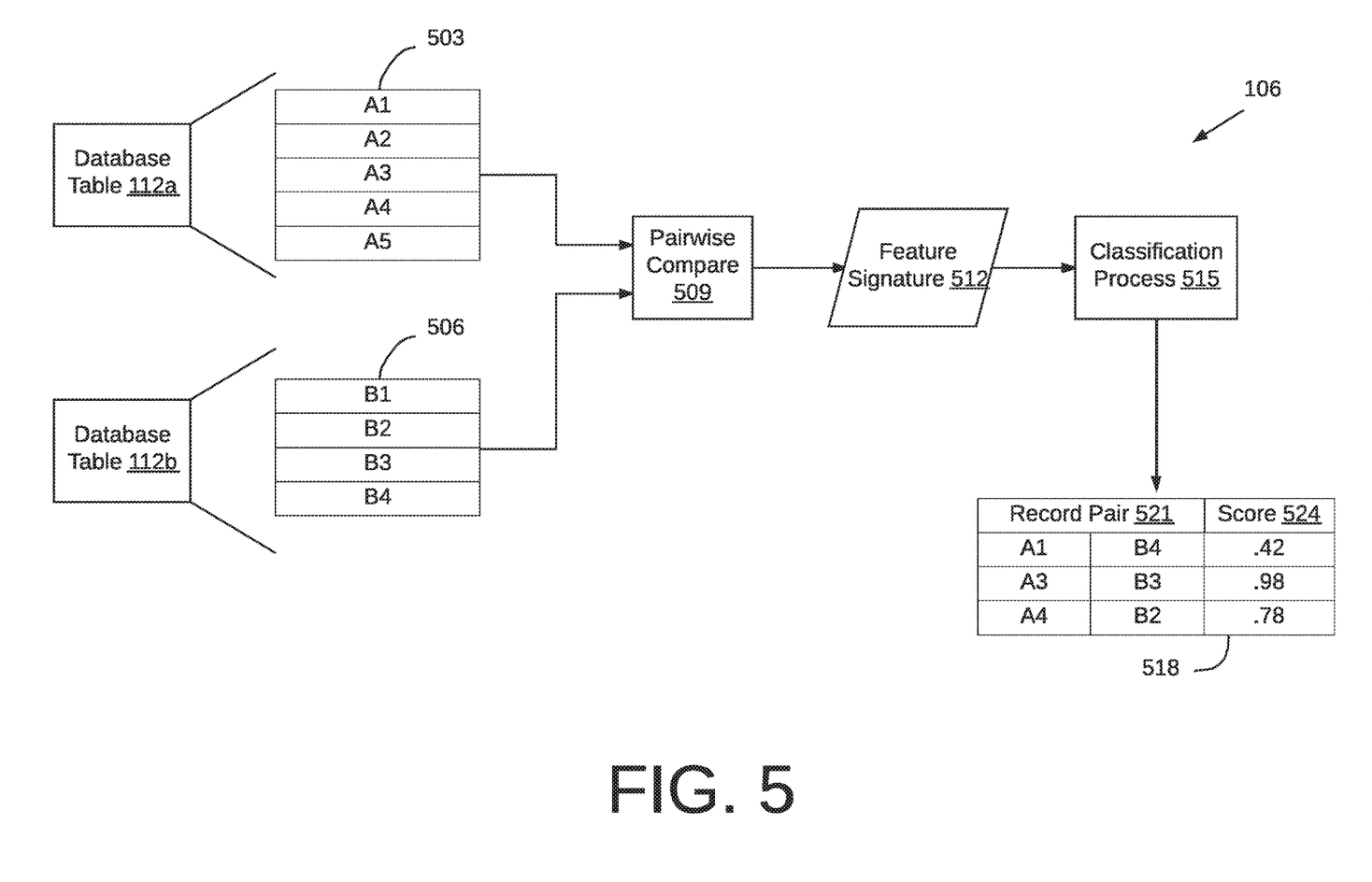
FIG. 5 is an example of operations performed by the software application 106 in the computing system 100 of FIG. 1 according to various embodiments of the present disclosure.

FIG. 5 is an example of operations performed by the software application 106 in the computing system 100 of FIG. 1 according to various embodiments of the present disclosure. The operations shown in FIG. 5 demonstrate a manner of comparing two records to create a dynamically merged database table 416 (FIG. 4).

The software application 106 is configured to access records in a first database table 112a and records in a second database table 112b. The software application 106 selects a record pair made up of a first record 503 and a second record 506 taken from a first and second database table 112a and 112b, respectively. Once a record pair is selected, the software application 106 performs a pairwise comparison 509. This may involve comparing the field values between the two records 503 and 506. As shown in FIG. 5, a first record 503 may be "A1" and a second record 506 may be "B1."

The pairwise comparison 509 generates a feature signature 512, which is created using a set of features between a pair of records. The feature signature 512 reflects how two records are similar or dissimilar based on the records' contents. As an example, the feature signature may be generated using a number of features such as "fuzzy_first_name_match", "fuzzy_last_name_match", "email_match", "zip_code_match", "last_4_SNN_digits_match", etc. Two different record pairs may have the same feature signature 512 even though they represent different entities. In this case, it is inferred that the records in the first pair are similar to each other in the same way that the records in the second pair are similar to each other. For example, given the trivial set of binary features "Fuzzy Last Name match" and "Fuzzy First Name match", the record pair {"Stephen Meyles", "Steve Myles") will generate a feature signature of [1 1], where "1" refers to a binary value indicating a match. In addition, a record pair of ("Derek Slager", "Derke Slagr" } will also generate a feature signature of [1 1]. This does not necessarily mean that the first pair of records are related to the same real-world identity as the second pair of records. Instead it suggests that the records have the same data variations (fuzzy matches of first and last name). Records with the same data variations may have the same feature signature 512.

By way of example using binary features, assume that a first record having fields F1-F5 is compared to a second record having fields F1-F5 to determine the following five features: "F1_match", "F2_match", F3_match", F4_match", and F5_match". In addition, assume that the values in fields F1 and F2 are the same while the values in fields F3-F5 are different between the two records. Then, a feature signature 512 may be "11000." The "1s" in the feature signature 512 refer to fields that have common values while the "0s" refer to fields that have different values. Here, F1=1, F2=1, F3=0, F4=0, and F5=0, yielding "11000." In other embodiments, non-binary features may be used to construct a feature signature 512. For example, a "fuzzy_match" feature may yield a score ranging from 0 to 1 that correlates the strength of similarity between field values.

After generating the feature signature 512, the software application 106 uses a classifier 109 (FIG. 1) to perform a classification process 515 on the feature signature 512 to generate a result 518. The classification process generates a confidence score 524 which represents a level of confidence that a particular record pair 521 represents the same entity. The example in FIG. 5 shows a confidence score 524 that ranges from 0 to 1, where 0 represents 0 percent confidence that two records are similar and where 1 represents a 100% confidence. A first record pair 521 made up of record "A1" and record "B4" (See FIG. 2) yields a confidence score 524 of "0.42." In other words, there is a 42% confidence that record "A1—Jane Doe" refers to the same person that is referenced in record "B4—Janet Doe." Stated differently, the confidence score 524 corresponds to a confidence level that a record pair 521 represents duplicative or redundant information.

Figure 6A:
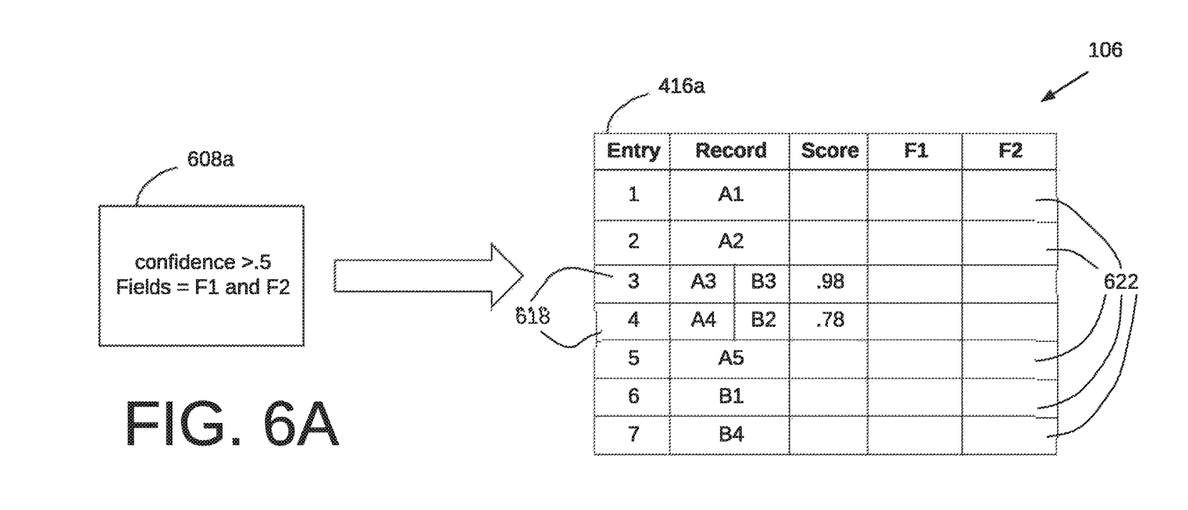
FIGS. 6A and 6B are examples of dynamically merged database tables created within the computing system 100 of FIG. 1 according to various embodiments of the present disclosure.
Figure 6B:
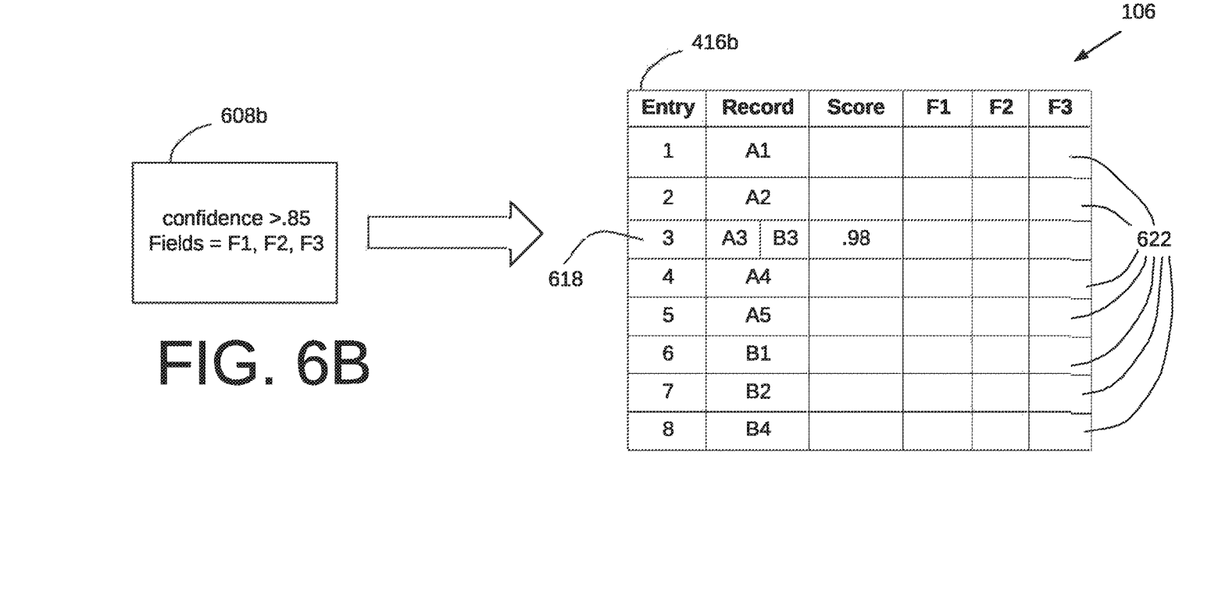

FIGS. 6A and 6B are examples of dynamically merged database tables created within the computing system 100 of FIG. 1, according to various embodiments of the present disclosure. FIGS. 6A and 6B show different examples of dynamically merged database tables 416 generated in response to different parameters 608. The dynamically merged database tables 416 includes one or more related record pairs 618 and one or more unique records 622. Related record pairs 618 refer to a pair of records taken from the first database table 112a and the second database table 112b that have a relatively high confidence that the record pair commonly represents the same entity, such as a person or other real-world entity. Unique records 622 are records that have a relatively high confidence that they uniquely refer to different entities, such as different people.

FIG. 6A shows a software application 106 that generates a dynamically merged database table 416a based on parameters 608a. The parameters 608a may be specified by a user who wishes to merge a first database table 112a (FIG. 2) with a second database table 112b (FIG. 2). The parameters 608 may include a threshold confidence level and/or a database merge rule. The threshold confidence level may be a value that correlates to a degree that two records are similar or likely to be similar. In FIG. 6A the user has specified a threshold confidence level of 0.5. A lower confidence level may lead to more related record pairs 618. This can reduce the number of entries in the dynamically merged database table 416a. In other words, a lower threshold confidence level means there is more tolerance when grouping together two records from different database tables 112a and 112b.

The parameters 608a also comprises a database merge rule which includes, for example, a specification of desired fields. As shown in FIG. 6A, a user wishes to customize a dynamically merged database table 416a to include only fields F1 and F2 (as opposed to all available fields). Thus, the database merge rule indicates one or more desired field selected from fields 213 (FIG. 2) within the first database table 112a or the second database table 112b. The merge rule may also indicate a manner for consolidating variations in the information in desired fields from the related records. For example, if A4 and B2 form a related record pair 618, a merge rule can specify how to determine field values of the dynamically merged database table based 416a on the field values of records A4 and B2. One example is to select the field values of the most recent record among the record pair. Here, the name of the record associated with the most recent timestamp will be selected.

The use of database merge rules as a parameter 608a allows users to generate dynamically merged database tables 416a for specific purposes. If the user wishes to change the fields 213 in the dynamically merged database tables 416a, the user can create a new dynamically merged database table 416 with different merge rules.

The dynamically merged database table 416a of FIG. 6A shows how a first database table 112a (FIG. 2) has been dynamically merged with a second database table 112b (FIG. 2) in response to parameters 608a. Rather than having a separate entry for records A1-A5 and B1-B4, the dynamically merged database table 416a combines record "A3" with "B3" and further combines record "A4" with "B2." The manner of combining two records is determined according to a merge rule. Both record pairs 618 have a confidence level that exceeds a specified threshold confidence level of "0.5." Records A3 and B3 form a related record pair 618 because they have relatively high confidence that they refer to the same entity, a person named "Stephen Meyles." Specifically, the A3-B3 record pair 521 has a confidence score 524 of "0.98" which is relatively higher than the threshold confidence level of "0.5" of the user-specified parameters 608a. Similarly, the A4-B2 record pair 521 is also considered a related record pair 618 in the example of FIG. 6A.

Records A1, A2, A5, B1, and B4 form a set of unique records with respect to the first and second database tables 112a and 112b. In other words, based on the threshold confidence level of "0.5," records A1, A2, A5, B1, and B4 are not sufficiently similar to be part of a related record pair 618. For example, record "A1," which is in the first database table 112a, is not similar enough with respect to the records in the second database table 112b by comparing the confidence scores 524 with the threshold confidence level.

The dynamically merged database table 416a provides each unique record 622 its own database entry. It also combines the related record pair 618 to conform to a single database entry. Thus, each related record pair 618 is treated as a single entry within the dynamically merged database table 416a.

In various embodiments, the merge rule can specify that the field values of a related record pair 618 should be equal to either one of the original field values. For example, record "A4" refers to a person named "Carlos Sakoda" and record "B2" refers to a person named "Chuck Sakoda." The software application 106 determined that the record pair 521 of "A4-B2" has a confidence score of "0.78." Qualitatively, that means that there is a reasonably high confidence that "A4" and "B2" refer to the same entity, which represents a particular person in the real-world. If the parameter specifies a confidence level of greater than "0.5," the dynamically merged database table 416a will treat this record pair 521 as a related record pair 618 having a single database entry. Moreover, the F1 field, "first name," is equal to "Chuck" OR "Carlos." A merge rule may specify the manner in selecting to use either "Chuck" OR "Carlos" in the dynamically merged database 416a. Thus, the field value may be an array of values derived from the original field values in the related record pair 618. As another example, the merge rule may choose the longer of two text strings of competing field values. In this case, "Carlos" would be selected over "Chuck" because it is longer in terms of the number of characters. In any case, the resulting database entry for a related record pair 618 is derived from the field values of the records in the related record pair 618.

In other embodiments, the merge rule may specify a format for the field values that is not necessarily used in the original records. For example, the merge rule may specify using a postal service address format for address field values. Here, an address field value in the merged database table 416 would be derived from the address field values contained within both records in the related record pair 618.

The dynamically merged database table 416a is linked to any relational tables 115 (FIG. 4) that are originally linked to the first or second database tables 112a or 112b (FIG. 4). This is explained in the following example. Record "B2" is part of the second database table 112b. As shown in FIG. 4, the second database table is linked to relational table 115c. The relational table 115c may be used, for example, to store transaction history for each customer record in the second database table 112b. In this case, a customer record in the second database table 112b, such as "B2," is linked to transaction history stored in the relational table 115c. Because the dynamically merged database table 416a has joined B2 with A4, A4 is transitively linked to the relational table 115c because it is part of a related record pair with respect to record "B2." Thus, the transaction history for "Chuck Sakoda" now applies to "Carlos Sakoda." By leveraging the preexisting relational table 115c, no new relational table needs to be created.

FIG. 6B shows a different parameter 608b used to generate a second dynamically merged database table 416b. Multiple dynamically merged database tables 416 may be generated in response to different parameters 608. This is because the underlying database tables 112 are persistently stored in a database 103 (FIG. 1). In FIG. 6B the user specifies a threshold confidence level of "0.85." This is higher than the confidence level specified in the example of FIG. 6A. A user may wish to have a higher confidence level to reduce the occurrence of inaccurately identifying related record pairs 618 at the cost of increasing the size of the dynamically merged database table 416b. In this example, the software application 106 will likely find fewer related record pairs 618 with a higher threshold confidence level.

When comparing FIG. 6A to FIG. 6B, the second dynamically merged database table 416b separates out records "A4" and "B2" as two unique records 622 while the first dynamically merged database table 416a treated these two records as a related record pair 618. This is because the record pair A4-B2 has a threshold confidence level of "0.78" which meets the parameters 608a in FIG. 6A but not the parameters 608b of FIG. 6B. As a result, the second dynamically merged database table 416b has a larger size, in terms of number of record entries.

Figure 7:
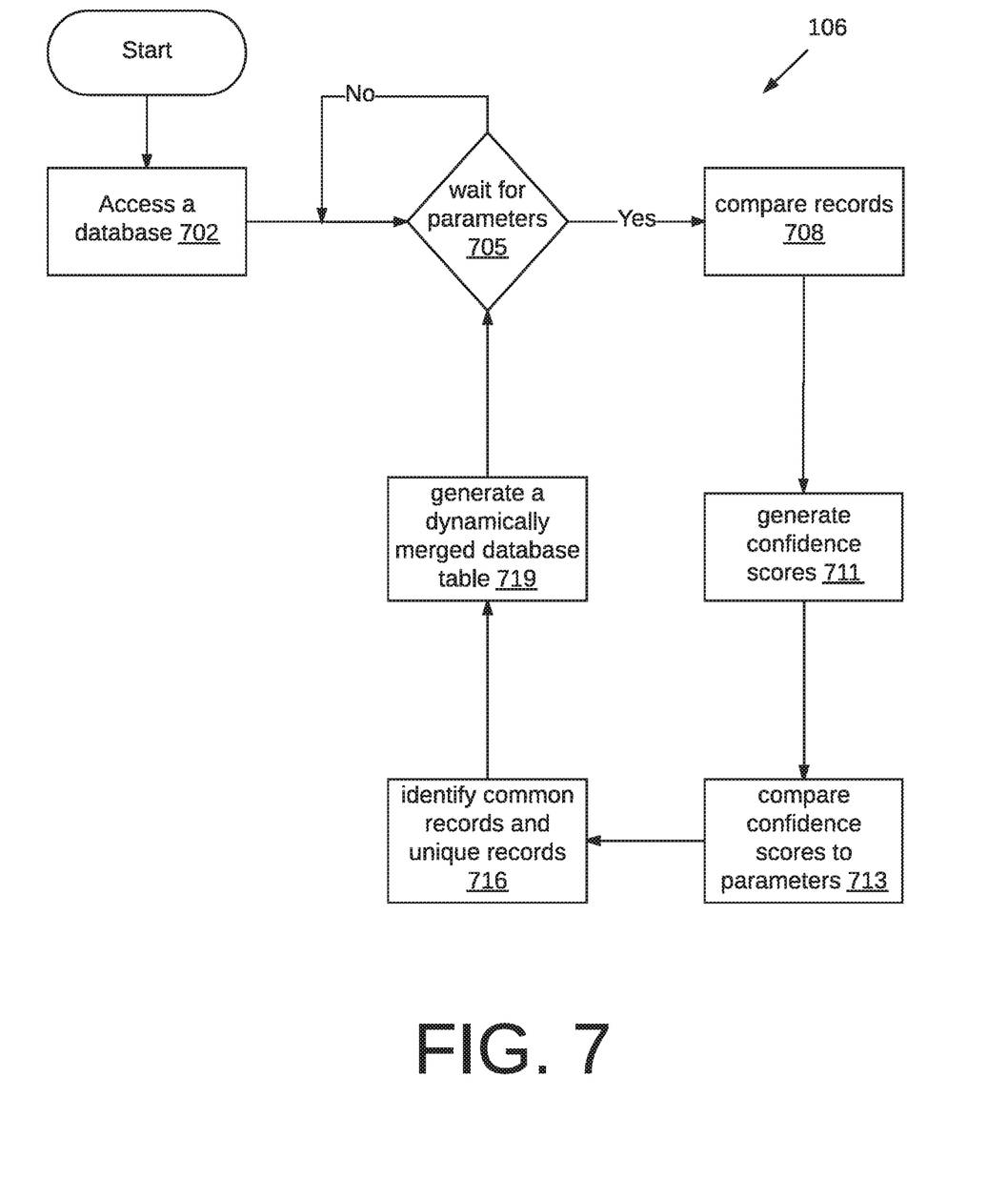
FIG. 7 is a flowchart illustrating an example of the functionality of the software application executed in a computing system 100 of FIG. 1 according to various embodiments of the present disclosure.

FIG. 7 is a flowchart that provides an example of the operation of the software application 106 according to various embodiments. It is understood that the flowchart of FIG. 7 provides merely an example of the many different types of functional arrangements that may be employed to implement the operation of the portion of the software application as described herein. As an alternative, the flowchart of FIG. 7 may be viewed as depicting an example of elements of a method implemented in the computing system 100 (FIG. 1) according to one or more embodiments.

Beginning at 702 software application 106 accesses a database 103 (FIG. 1). Here, the software application 106 selects two database tables 112 (FIG. 1) to dynamically merge. The database tables may use semantic fields to assist in the comparison of fields between a first database table 112a and a second database table 112b (FIG. 2). The software application 106 may have continuous access to the database 103 in order to generate dynamically merged database tables 416 (FIG. 4).

At 705 the software application 106 waits to obtain parameters from a user. Parameters 608 are used to determine how to dynamically merge the first and second database tables 112a and 112b. A user may specify a parameter 608 (FIGS. 6A and 6B) by providing user input to the software application 106. The user may submit user input via an online portal, client-side application, online form, or any other mechanism to transmit data within the computing system 100 (FIG. 1). The software application 106 obtains the parameters 608 from a user's client device that interfaces with the software application 106.

At 708 the software application 106 compares the records in the first database table 112a and records in the second database table 112b to determine a confidence score 524 between different record pairs 521. The confidence score 524 is used to identify related record pairs 618, which are duplicative or redundant records existing within the first and second database tables 112a and 112b. For example, the software application 106 may perform a number of pairwise comparisons 509 (FIG. 5) on various record pairs 521 (FIG. 5) taken from the first and second database tables 112a and 112b. The pairwise comparison 509 may yield a feature signature 512 that quantifies the similarity between two records. The feature signature 512 may indicate which fields have related values between two records. Thereafter, the software application 106 may use a classifier 109 (FIG. 1) to evaluate the feature signature 512.

At 711 the software application generates confidence scores 524 (FIG. 5) for different record pairs 521. As mentioned above, the software application 106 may invoke the classifier 109 to quantify the probability or likelihood that two records reflect the same entity. In other words, the classifier 109 may generate a confidence score 524 that corresponds to the level of confidence that a record pair 521 should be deemed a related record pair 618 (FIG. 6) according to a threshold.

At 713 the software application 106 compares the confidence scores of various record pairs 521 to a threshold confidence level that is submitted as a parameter 608. At 716 the software application identifies related record pairs 618 and unique records 622. When a record pair 521 has a corresponding confidence score 524 (FIG. 5) that exceeds the threshold confidence level, that record pair 521 is considered to be a related record pair 618. When a record pair 521 has a corresponding confidence score that does not exceed the threshold confidence level, the individual records in the record pair 521 are treated as unique records 622 (FIG. 6). Unique records 622 may include records within the first and second database tables 112a and 112b that are not part of a related record pair 618.

At 719 the software application 106 generates a dynamically merged database table 416 that includes a selected portion of the related record pairs 618 and includes the unique records. One record among the related record pairs 618 may be selected as a single table entry of the dynamically merged database table 416. A merge rule determines a manner of selecting a record from the related record pair 618. In one embodiment, the merge rule indicates that the more recent record among a related record pair 618 is selected. In another embodiment, the merge rule specifies that the record from the first database table 112a should be selected. In this respect, the merge rule specifies how to consolidate variations of information in record fields among related record pairs 618.

Once created, the dynamically merged database table 416 is stored in the database 103 for future use. In addition, the first database table 112a and the second database table 112b continue to be persistently stored after the dynamically merged database table 416 is generated. Once generated, the software application 106 waits for new parameters 705 to generate additional dynamically merged database tables 416. This way, the software application 106 may generate a plurality of dynamically merged database tables 416 by varying the user-specified threshold confidence level or any other parameter 608.

Figure 8:
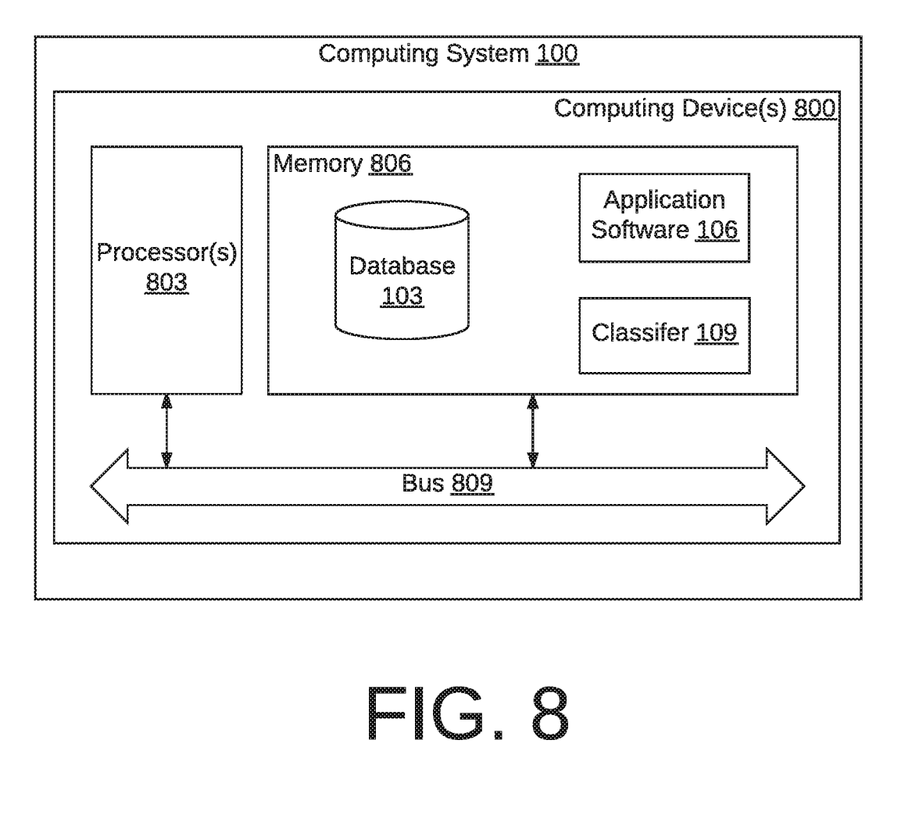
FIG. 8 is a schematic block diagram that provides one example illustration of a computing system 100 of FIG. 1 according to various embodiments of the present disclosure.

FIG. 8 shows a schematic block diagram of the computing system 100 according to an embodiment of the present disclosure. The computing system 100 includes one or more computing devices 800 Each computing device 800 includes at least one processor circuit, for example, having a processor 803 and a memory 806, both of which are coupled to a local interface 809 or bus. To this end, each computing device 800 may comprise, for example, at least one server computer or like device. The local interface 809 may comprise, for example, a data bus with an accompanying address/control bus or other bus structures as can be appreciated.

Stored in the memory 806 are both data and several components that are executable by the processor 803. In particular, stored in the memory 806 and executable by the processor 803 is the software application 106. Also stored in the memory 806 may be a database 103 and other data such as, for example, dynamically merged database tables 416, scores 524, previously used parameters 608, or any other data used to dynamically generate merged database tables. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

Several software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the software application 106 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 7 shows the functionality and operation of an implementation of the software application 106. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more boxes may be scrambled relative to the order shown. Also, two or more boxes shown in succession in FIG. 7 may be executed concurrently or with partial concurrence. Further, in some embodiments, one or more of the boxes shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software application 106 may also comprise software or code that can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application 106, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 800, or in multiple computing devices in the same computing system 100. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
a database that stores a first database table and a second database table, the first database table comprising a first set of records and a first plurality of fields for the first set of records, the second database table comprising a second set of records and a second plurality of fields for the second set of records; and
a memory coupled to a processor, the memory comprising a plurality of instructions that cause the processor to:
perform a comparison between the first set of records and the second set of records;
identify a plurality of record pairs based on the comparison, each record pair comprising a record in the first set of records and a record in the second set of records;
generate a feature signature for each record pair by comparing field values in each record pair;
classify the feature signature to identify at least one related record pair; and
generate a merged database table comprising the at least one related record pair and comprising a set of unique records among selected from the first set of records and the second set of records.

2. The system of claim 1, wherein the plurality of instructions further cause the processor to preserve the first database table and the second database table after the merged database table is generated.

3. The system of claim 1, wherein the first database table is linked to a first relational table and wherein the merged database table is linked to the first relational table.

4. The system of claim 1, wherein the merged database table is generated according to a user-specified threshold confidence level.

5. The system of claim 4, wherein the plurality of instructions further cause the processor to generate a plurality of merged database tables corresponding to various user-specified threshold confidences levels.

6. The system of claim 1, wherein the plurality of instructions further cause the processor to obtain a database merge rule, the database merge rule indicating a specification of at least one desired field selected from at least one of the first plurality of fields or the second plurality of fields.

7. The system of claim 1, wherein the plurality of instructions that cause the processor to classify the feature signature comprises a binary classifier.

8. A system comprising:
a database that stores a first database table and a second database table, the first database table comprising a first set of records and a first plurality of fields for the first set of records, the second database table comprising a second set of records and a second plurality of fields for the second set of records; and
a processor in data communication with a memory, the processor being configured to:
perform a comparison between the first set of records and the second set of records;
identify a set of related record pairs based on the comparison by comparing field values to generate a feature signature and classifying the feature signature to generate a confidence score;
identify a set of unique records among the first set of records and the second set of records based on the comparison; and
generate a merged database table comprising at least a portion of the set of related records and comprising the set of unique records.

9. The system of claim 8, wherein the processor is further configured to preserve the first database table and the second database table after the merged database table is generated.

10. The system of claim 8, wherein the first database table is linked to a first relational table and wherein the merged database table is linked to the first relational table.

11. The system of claim 8, wherein the at least a portion of the set of related records is determined by selecting field values within each related record pair according to a database merge rule, the database merge rule indicating a specification of at least one desired field selected from at least one of the first plurality of fields or the second plurality of fields.

12. The system of claim 8, wherein the processor is configured to obtain a user-specified threshold confidence level, wherein the merged database table is generated based on the user-specified threshold confidence level.

13. The system of claim 12, wherein the processor is configured to generate a plurality of merged database tables corresponding to various user-specified threshold confidence levels.

14. The system of claim 12, wherein the processor is configured to obtain a database merge rule, the database merge rule indicating a specification of at least one desired field selected from at least one of the first plurality of fields or the second plurality of fields, wherein the merged database table is generated according to the merge rule.

15. A computer implemented method comprising:
- storing, in a database, a first database table and a second database table, the first database table comprising a first set of records and a first plurality of fields for the first set of records, the second database table comprising a second set of records and a second plurality of fields for the second set of records;
- comparing the first set of records and the second set of records;
- identifying a set of related record pairs based on the comparison, wherein for each related record pair, field values are compared to generate a feature signature for the related record pair and the feature signature being classified by a classifier to generate a confidence score;
- identify a set of unique records among the first set of records and the second set of records; and
- generating a merged database table comprising at least a portion of the set of related record pairs and comprising the set of unique records.

16. The method of claim 15, further comprising preserving the first database table and the second database table after the merged database table is generated.

17. The method of claim 15, wherein the first database table is linked to a first relational table and wherein the merged database table is linked to the first relational table.

18. The method of claim 15, wherein the at least the portion of the set of related record pairs is determined by selecting field values within each related record pair according to a merge rule.

19. The method of claim 15, further comprising obtaining a database merge rule, the database merge rule indicating a specification of at least one desired field selected from at least one of the first plurality of fields or the second plurality of fields.

20. The method of claim 15, further comprising generating a plurality of merged database tables corresponding to various user-specified threshold confidence levels.

* * * * *